(12) United States Patent
Fisher et al.

(10) Patent No.: US 6,322,021 B1
(45) Date of Patent: Nov. 27, 2001

(54) DEPLOYABLE WING WITH PROPULSION FOR RANGE EXTENSION

(75) Inventors: Jeffrey A. Fisher, Huntsville; Edward V. Miller, Owens Cross Road, both of AL (US)

(73) Assignee: Advanced Systems Technology, INC, Huntsville, AL (US)

( * ) Notice: Subject to any disclaimer, the term of this patent is extended or adjusted under 35 U.S.C. 154(b) by 0 days.

(21) Appl. No.: 09/593,229

(22) Filed: Jun. 14, 2000

(Under 37 CFR 1.47)

(51) Int. Cl.[7] .................................................. G64C 31/02
(52) U.S. Cl. .................. 244/49; 244/139; 244/137.3; 244/16; 244/902; 244/903
(58) Field of Search .................. 244/49, 139, 137.3, 244/16, 900, 901, 902, 903

(56) References Cited

U.S. PATENT DOCUMENTS

| | | | |
|---|---|---|---|
| 4,586,681 | * 5/1986 | Wedertz et al. | 244/49 |
| 4,596,368 | * 6/1986 | Schmittle | 244/903 |
| 4,601,443 | * 7/1986 | Jones et al. | 244/903 |
| 4,623,108 | * 11/1986 | Musick | 244/903 |
| 4,773,619 | * 9/1988 | Rubik | 244/49 |
| 4,779,820 | * 10/1988 | Lambert | 244/49 |
| 5,474,257 | * 12/1995 | Fisher et al. | 244/49 |
| 5,878,979 | * 3/1999 | Fisher et al. | 244/139 |
| 5,884,863 | * 3/1999 | Fisher et al. | 244/139 |

* cited by examiner

*Primary Examiner*—J. Woodrow Eldred
(74) *Attorney, Agent, or Firm*—Norman Friedland

(57) ABSTRACT

A deployable wing that is folded so as to fit into a carrier such as an airplane that is released and automatically with the aid of parachutes to deploy and fly a given distance without assistance other than steering to reach a given destination and a propeller driven by a gas powered engine is actuated to propel the wing an extended distance. A guard is disposed adjacent to the propeller to assure that the lines of the parachutes do not get tangled into the propeller blades.

12 Claims, 3 Drawing Sheets

DEPLOYABLE WING WITH PROPULSION FOR RANGE EXTENSION

TECHNICAL FIELD

This invention relates to deployable wings that are carried in the crated state and deployed by aircraft and automatically deployed in the form of a glider and in particular to propulsion mechanism added on to the deployable wing to extend the range thereof.

BACKGROUND OF THE INVENTION

This invention constitutes an improvement over the apparatus disclosed in U.S. Pat. No. 5,474,257 granted to Fisher et al on Dec. 12, 1995 entitled "Deployable Wing", U.S. Pat. No. 5,884,863 granted to Fisher et al on Mar. 23, 1999 entitled "Method and Apparatus For Deploying A Wing " and U.S. Pat. No. 5,878,979 granted to Fisher et al on Mar. 9, 1999 entitled "Method And Apparatus For Landing A Wing", which all are incorporated herein by reference. These patents essentially details a deployable wing that includes mechanism for controlling the landing thereof. In particular, the wing is foldable to a relatively narrow mechanism that is capable of being lifted into air via a cargo type of aircraft such as the Air Force's C-130 airplane and is released from the cargo bay and an actuator is activated to cause the wing to deploy and extend into a relatively delta airfoil. The wing consists of diverging leading edge spars attached to a keel spar and cross spars that support a fabric sail. The sail is made in substantially two major portions, an upper section and a lower section that define a relatively closed chamber having an opening or ram air intake at the fore end (nose stagnation point) to lead ram air internally thereof. The wing includes a leading edge with a front point, trailing edge, and controllable wing tips. The wing may have a king post attached to and extending from the keel, a cargo pod mounted to the wing via the keel. The wing carries a first parachute attached to the slider slidably mounted on the keel of the wing where the parachute provides force for causing the wing to deploy to its full open and gliding position. A second parachute attached to the wing is used for decelerating the wing and allowing it to land in a controllable and safe descent to the ground. This second parachute system assures that the wing descend to the ground in primarily a vertical direction relative to ground. The wing may be controlled by an automatic navigational system or by a remotely controlled radio transmitter.

While such systems have utility in certain applications where it is desirable to deliver a pay load several miles, say up to thirty (30) miles from the point of drop off from the aircraft, there are other applications, where it is desirable to extend the distance and that is the essence of this invention. It should be pointed out that there are no controllable wings that are designed to deliver a pay load to an extended distant destination prior to this invention. This invention contemplated adapting an internal combustion piston engine to the wing and activating the engine automatically or by remote control at a given point during the flight of the wing after it is deployed. Incorporation of the propulsion will extend the range of the otherwise glider and will afford the option of dropping a payload (or other mission objective) then return under power to a recovery point. The invention contemplates mechanism to assure that the parachute and/or its chords connected to the wing which are used to assist in the landing thereof does not get tangled up with the propeller driven by the engine.

SUMMARY OF THE INVENTION

An object of this invention is to provide a deployable wing with propulsion means for extending the range thereof;

A feature of this invention is the addition of a internal combustion piston engine and propeller mounted on the vehicle.

Another feature of this invention is the provision of mechanism for preventing the landing parachute and its cords from being tangled in the propeller/engine mechanism.

The foregoing and other features of the present invention will become more apparent from the following description and accompanying drawings.

These figures merely serve to further clarify and illustrate the present invention and are not intended to limit the scope thereof.

DETAILED DESCRIPTION OF THE INVENTION

Figure 1:
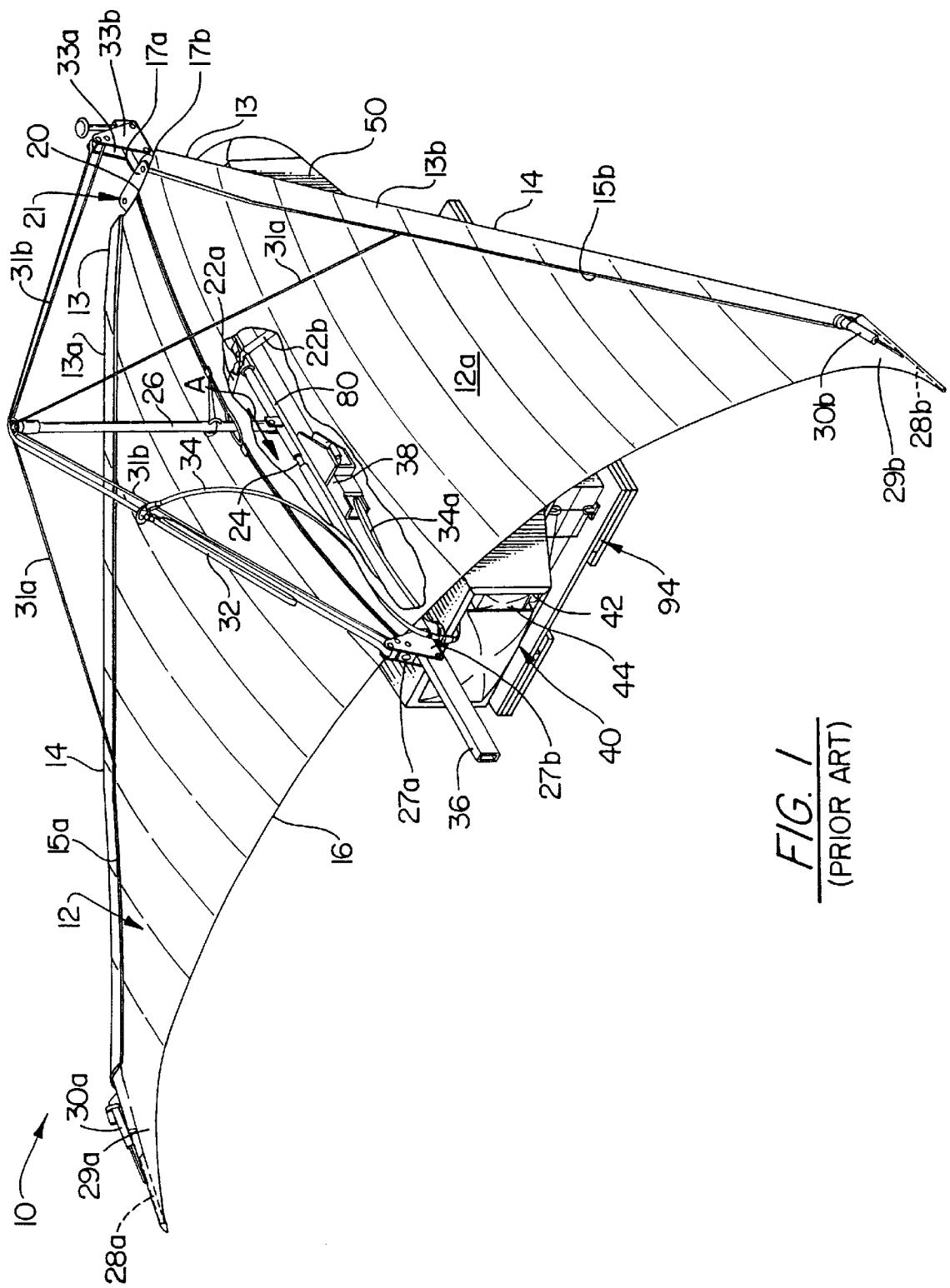
FIG. 1 is a perspective view, partly broken away, of the prior art deployable wing.
Figure 2:
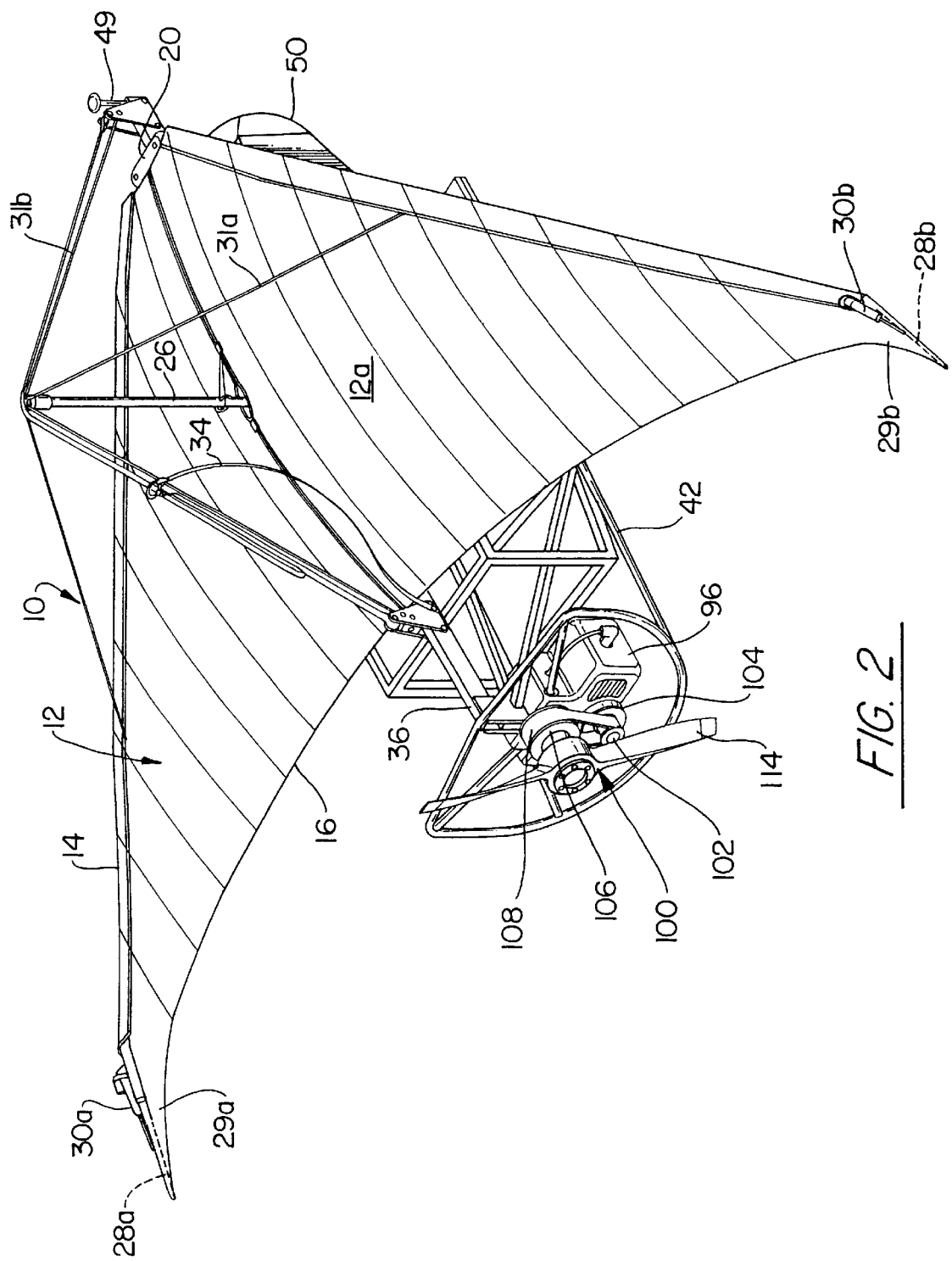
FIG. 2 is a perspective view of the wing depicted in FIG. 1 with the addition of the motivating mechanism for extended flight of this invention.
Figure 3:
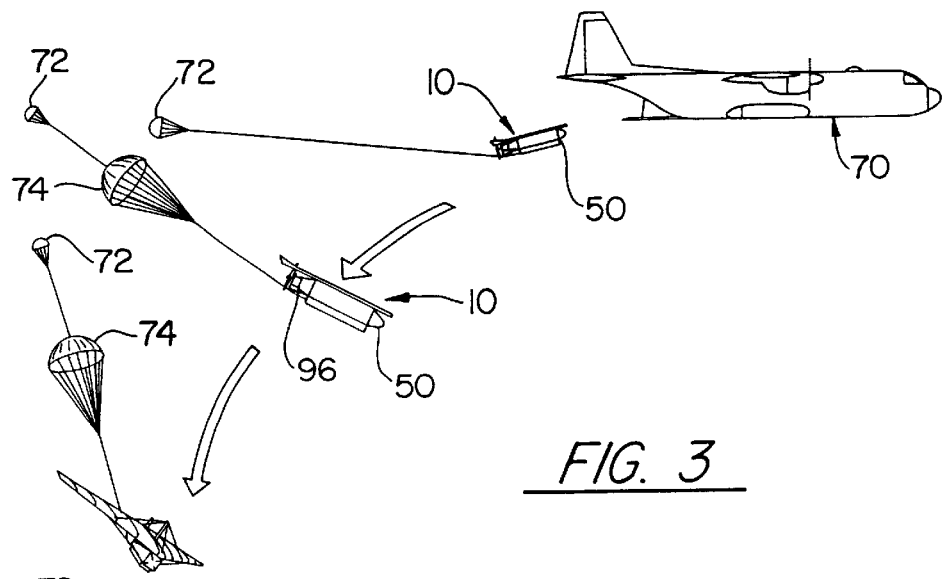
FIG. 3 is a diagrammatic view showing the deployment of the wing and its gliding descent to land.
Figure 3:
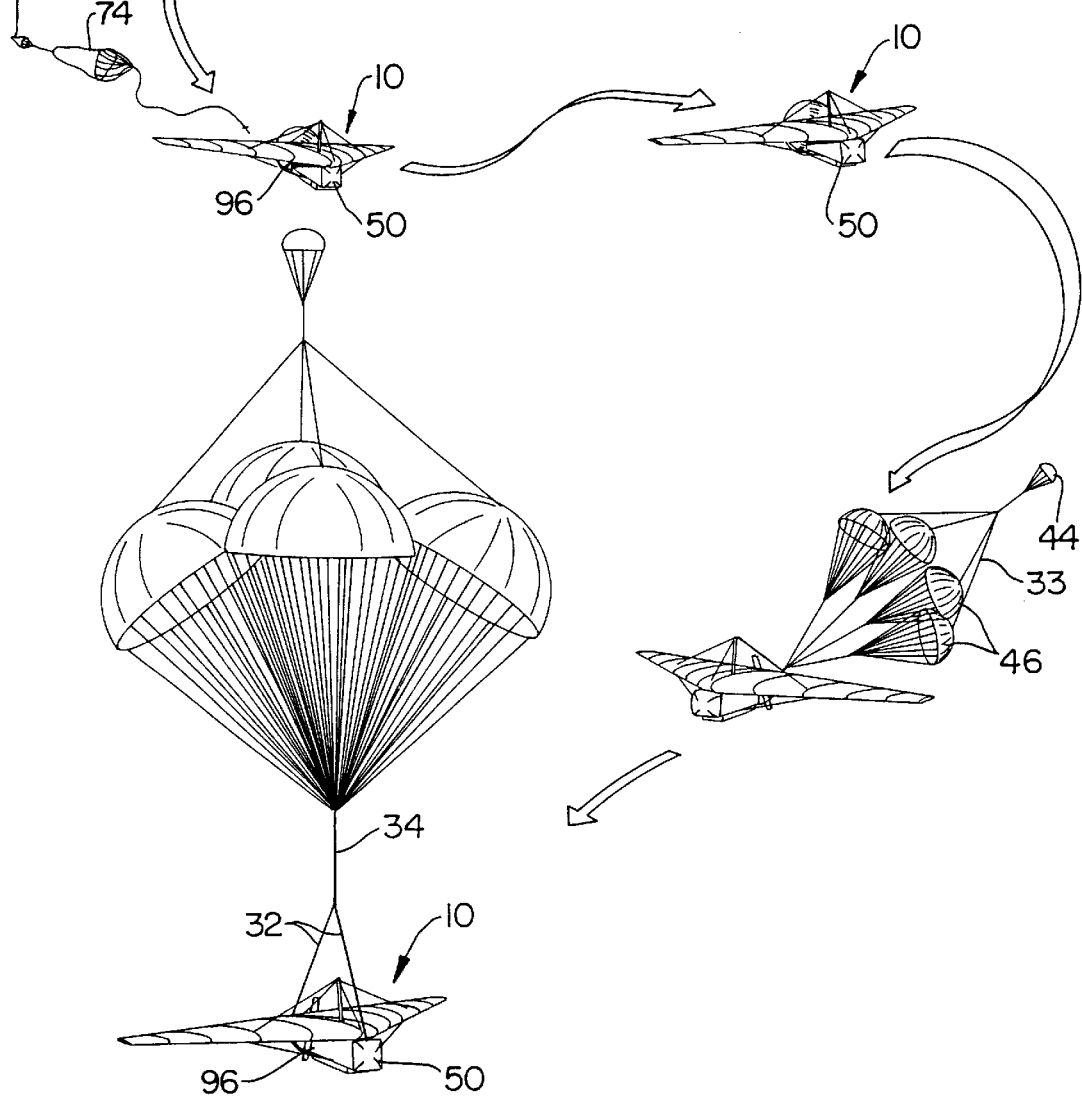

Referring now in specific detail to the drawings, with like reference numerals identifying similar or identical elements, FIG. 1 illustrates a perspective view, partially broken away, of one embodiment of the deployable wing 10 of the present application. As illustrated in FIG. 1, wing 10 includes a fabric sail 12 defining a leading edge 14 and a trailing edge 16. Fabric sail 12 preferably includes an upper section 12a substantially joined along its perimeter to a lower section (not shown) and a plurality of fabric ribs (not shown) connected to the upper and lower sections of the fabric sail. Joining the upper and lower sections forms an envelope which can be filled with air through a ram air intake 20 preferably located at the foremost point of the wing. In the present embodiment fabric sail 12 further includes an integral stowed cover flap 13 comprising a first section 13a and a second section 13b, each of which is disposed along the leading edge of wing 10 as shown in FIG. 1. First and second sections 13a, 13b each further include complimentary zipper members 15a, 15b which matingly engage in a conventional manner to contain fabric sail 12 within the integral cover as described hereinbelow when stowed or packed. In the present embodiment cover 13 is preferably made of dacron fabric while zipper members 15a, 15b are of a sufficiently high strength and durability to operate under deployment conditions, although other materials may be utilized depending upon the design configurations of the wing.

With continued reference to FIG. 1, wing 10 further includes an internal structure comprising two leading edge spars (not shown), two cross-spars 22a, 22b, a keel 24, a kingpost 26 and a control device, such as elevon struts 28a, 28b. The leading edge spars are pivotally attached at one end between faceplates 17a and 17b to form foremost point 21. Pivotally connected the leading edge spars at a second end thereof are elevon struts 28a, 28b. Keel 24 is mounted at a first end between faceplates 17a and 17b, and is mounted at an opposite end between rear plate members 27a and 27b and is disposed between the leading edge spars. Cross spars 22a, 22b each include an outboard end which is pivotally attached to a corresponding leading edge spar and further include inboard ends, opposite the outboard ends, which are pivotally attached to keel 24, preferably via a common slider 80. Kingpost 26 is also preferably mounted to keel 24 via the common slider. When erected, kingpost 26 extends substantially perpendicular to keel 24, through an opening in fabric sail 12, to provide an upper attachment point for wires 31a, 31b which support the wing on landing and when the wing experiences negative loads or inverted flight. In the present embodiment kingpost 26 is pivotally attached to slider 32 such that linear movement of the slider in the direction of arrow "A" causes kingpost 26 to erect through the fabric sail, substantially perpendicular to the keel.

The leading edge spars and cross spars are preferably pivotally mounted such that in a closed or pre-deployed position the leading edge spars and cross spars 22a, 22b rest substantially parallel to keel 24. In the closed position the common slider is preferably disposed adjacent the foremost point and kingpost 26 is preferably disposed adjacent and substantially parallel to keel 24. In the closed position complimentary zipper members 15a, 15b are matingly engaged in a conventional manner to contain fabric sail 12 within the integral cover. Preferably, the leading edge spars, cross spars, keel, elevon struts, kingpost and wing tips 29a, 29b are all substantially disposed within fabric sail 12 in the closed position.

The length of each leading edge spar is dependent upon the desired size of wing 10, which is only limited by practical considerations: size once folded, desired cruise speed, weight of the payload, etc. Once opened, or deployed, the leading edge spars form an angle therebetween. The size of the angle depends upon aerodynamic considerations including aspect ratio, yaw stability, and deployment simplicity, among others. Typically, the angle ranges from about 90° to about 150° with about 105° to about 110° preferred due to simplicity of the deployment mechanism geometry. Angles greater than about 150° result in more complex, and therefore less desirable, mechanical/structural geometry and decreasing yaw stability, while angles less than about 90 ∠ result in decreasing glide ratio. Yaw stability is where wing sweep allows the wing to tend to maintain its flight directly into the wind, commonly known as maintaining the yaw heading. As the wing yaws, the windward wing tends to drag more than the leeward wing, thereby correcting for the yaw.

Cross spars 22a, 22b provide structural integrity to the wing 10 by providing strength to the leading edge spars to ensure that in the deployed position the leading spars remain in the open position with the appropriate angle therebetween. The distance between the attachment point of the outboard ends to their respective leading edge spars and the inboard ends to the keel determine the length of cross spars 22a, 22b.

With continued reference to FIG. 1, keel 24 similarly provides structural integrity to wing 10 by ensuring that the wing 10 opens to and maintains its full length from the leading edge 14 to the trailing edge 16, commonly known as the wing's chordwise length. The length of the keel 24 is substantially equivalent to the chordwise length of the wing at the root (very center line) which, as with the leading edge spars' length, is determined on a practical basis with aeronautical considerations effecting the ultimate size. Keel 24 also connects payload 50 to wing 10 via mounting member 36.

The present embodiment also includes elevon struts 28a, 28b which are each connected to a motor or fluid actuator 30a, 30b, the actuators being located externally of fabric sail 12 and mounted to the leading edge spars. The motor or actuator is conventional in design and operates to deflect or rotate each elevon struts 28a, 28b independently, out of the plane of the sail, thereby controlling the flight of the wing. By rotating the elevon struts, wing tips 29a, 29b are twisted up or down relative to the leading edge. This helical twisting of the sail results in an aerodynamic force sufficient to pitch or roll the wing. Rotating or deflecting the elevon struts in unison generates an aerodynamic force substantially behind the pressure center of the wing which is located at the point about 55% down the keel from the foremost point 16, thereby forming a moment force about the pressure center which is used for pitch control of the wing. By rotating or deflecting the elevon struts 28a, 28b singularly or in opposite directions, aerodynamic forces at the wing tips 29a and 29b can be controlled in magnitude and direction, up or down. For example, if the elevon strut 28a is rotated up while elevon strut 28b is rotated down, downward force is generated on tip 29a and an upward force on tip 29b, resulting in a roll or turn in the direction of strut 28a.

These elevon struts 28a, 28b, or other control devices, can be operated with any conventional motor capable of generating sufficient torque to overcome the aerodynamic forces at a speed sufficient for control response. Factors important in determining the required torque include wing area, wing loading, aspect ratio, and elevon strut length, among others. A wing having a 30 foot wing span, for example, with a sail area of about 190 ft$^2$ and a 700 lb load requires about 40 to about 80 ft lb torque while a 15 ft wing span wing with an area of 45 ft$^2$ and a 90 lb load needs about 15 to about 25 ft lb torque for control.

In the present embodiment, the length of kingpost 26 is approximately 4 ft. which, as with the keel's and leading edge spars' length, is determined on a practical basis with aeronautical considerations effecting the ultimate size. In addition to providing an upper attachment point for wires 31a, b as described above, kingpost 26 also provides support for strap 32 which is attached at one end between front plate members 33a, 33b, extends over the kingpost and is attached at an opposite end between rear plate members 27a, 27b. Strap 32 is of a sufficient length such that when the strap extends over the kingpost and is strapped between plate members 33a, 33b and 27a, 27b, there is enough slack present in the strap to allow the strap to be pulled free of the kingpost when parachutes 44 deploy.

Attached to strap 32 at approximately its midpoint, in the present embodiment, is parachute attachment line 34. The point at which line 34 attaches to strap 32 is the point at which the wing 10 with cargo pod, or payload 50 will hang substantially horizontal beneath the parachutes without excessive rotation or pitching. Likewise, the length of strap 32 is length at which the payload will hang substantially horizontal beneath the parachutes. Attachment of line 34 to strap 32 is achieved in the present embodiment through loops which are sewn onto strap 32 and line 34 and which are connected by a clevis fitting, though any conventional method of attachment which will allow for parachute deployment may be utilized. Attachment line 34 is joined at an opposite end to parachute deployment system 40 and includes a second line 34a which branches from the attachment line 34 and attaches to a secondary release mechanism 39?? disposed within mounting block 38. Mounting block 38 is connected to wing mounting member 36 which is mounted to both keel 24 and payload pod 0, the mounting member thereby attaching the payload to the wing. The secondary release mechanism 39 provides controlled release of a parachute deployment system 40 which is described in greater detail below. The present embodiment may include a platform 94 mounted to the underside of cargo pod 50 which aids in the mounting of the wing in the aircraft and in the landing thereof. An antenna 49 may also be carried on the fore end of the wing 10 for the radio control navigation.

In accordance with this invention a gasoline reciprocating-piston engine 96 of any suitable type and preferably in the 40–80 horsepower range, is attached to the support 36 of wing 10. The engine powers a propeller 100 mounted on shaft 101 is driven by the engine 96 via the main engine shaft 102, pulleys 104 and 106 and belt 108 interconnecting the pulleys. The propeller is of the fixed pitch version and preferably, the pitch is selected for the cruise mode of the wing. An radio frequency receiver is utilized to actuate the starter (not shown) of engine to turn it on during flight and de-activate the engine upon the descent mode. A generally circular shaped frame 110 made from tubular metallic material is supported to the pod 50 that is disposed aft of the propeller and has a bottom arcuate portion 112 that extends below the tip of the propeller blade 114. The frame assures that the parachute and its lines do not snare when deployed as will be described hereinbelow.

The operation of wing 10 is as follows: As mentioned above the wing 10 is preferably deployed from an aircraft 70. Prior to deployment wing 10 is placed in the closed or pre-deployed position and is loaded into the cargo bay of the airplane. The present embodiment includes a platform 94 mounted to the underside of cargo pod 50 that serves to secure the wing inside the airplane and to facilitate its extraction therefrom. When the aircraft has reached the site over which wing 10 is to be deployed, the wing is deployed from the aircraft, exiting therefrom, as shown in FIG. 8. Upon exiting the aircraft a static line deploys pilot parachute 72 which decelerates and stabilizes the wing, and releases a drogue parachute 74. Drogue parachute 74 then initiates deployment of wing 10 and then disengages from the wing. Deployment of wing 10 is described in greater detail in commonly assigned U.S. Pat. No. 5,884,863 granted to Fisher et al., on Mar. 23, 1999, which is hereby incorporated by reference.

Once deployed, the wing inflates with ram air and begins flight, gliding through the air where it is preferably guided to its desired destination by the on-board autopilot or radio frequency navigator system. At a predetermined time of the flight, either by an on-board control system or a signal from the radio frequency transmitted, the engine 96 is activated and powers the wing 10. Once wing 10 reaches its desired location, an extraction rocket is initiated, preferably by a first servo motor, but alternatively may be initiated prior to reaching its desired destination by a manual override signaling a second servo motor, or if electronic failure has occurred, by a mechanical system. Once initiated, and at which time the engine is turned off, the rocket is deployed from pod 50, thereby extracting pilot parachute 44, attached thereto. Pilot parachute 44 thereby releases a cluster of landing parachutes 46, which are attached thereto and which act as a brake to decelerate the wing as described hereinabove. Parachutes 46 are connected via line 34 to line 34a which is attached to the secondary release mechanism 39.

Upon deployment of landing parachutes 46, a force is exerted on line 34a which activates the secondary release mechanism 39a, the operation of which is described above. The secondary release mechanism 39 provides controlled movement of the landing parachutes 46 from an initial position extending rearwardly behind the wing, substantially in line with wing mounting member 36, to a position above the wing, after release of line 34a from the secondary release mechanism, thereby pulling strap 32 free from kingpost 26 as described hereinabove. The parachute system along with the secondary release mechanism allows for a rapid, substantially vertical descent of the wing while avoiding extreme rotation imparted on the wing by the deployment of the landing parachutes. The deployable wing of the present application is therefore capable of unmanned cargo delivery to a predetermined destination which is some distance beyond which the wing can fly without the assistance of the gasoline engine.

Although this invention has been shown and described with respect to detailed embodiments thereof it will be appreciated and understood by those skilled in the art that various changes in form and detail thereof may be made without departing from the spirit and scope of the claimed invention.

It is claimed:

1. In combination, a deployable wing defining a glider that is capable of being folded and carried by a carrier and released in the atmosphere, including a fabric sail mounted on a payload pod, a parachute attached to the deployable wing to cause said deployable wing to deploy into a glider for flying to a given destination with the aid of navigational control, a propeller, a gasoline engine for powering said propeller, an activating system for acuating said gasoline engine to power said propeller to fly said glider an extended distance with the aid of said navigational control and another parachute for providing controlled landing of said glider.

2. The combination of claim 1 wherein said gasoline engine is withing the 40 to 80 horsepower range.

3. The combination of claim 1 including a guard disposed adjacent to said gasoline engine and said propeller to prevent the ropes of the parachute from being entangled in the propeller blades.

4. The combination of claim 3 wherein said guard includes a tubular member mounted to said engine and located between said engine and said propeller and having a frustro-circular portion extending in proximity to the tips of the propeller blade.

5. The combination of claim 2 including a pulley mounted on the engine drive shaft and a complimentary pulley mounted on the propeller, a belt on said pulley and said complementary pulley for transmitting power from said engine to said propeller.

6. The combination of claim 4 wherein said propeller includes two blades.

7. In combination, a deployable wing comprising a fabric sail mounted to a payload pod, a keel having a slider mounted thereto and being within said fabric sail, a kingpost mounted to said slider and movable perpendicular to said keel in the deployed position, a parachute, a parachute deployment system attached to said slider for deploying for releasing said parachute to deploy said fabric sail to define the deployable wing, a second parachute, a second deployment system for releasing said second parachute to control landing of said pod, a propeller, an engine for powering said propeller mounted on said wing, an actuation system for starting said engine at a given destination of said deployable wing for propelling said deployable wing an extended distance, said actuation system for stopping said engine when said second parachute system is actuated to release said second parachute.

8. The combination of claim 6 wherein said engine is a gasoline engine and within the 40 to 80 horsepower range.

9. The combination of claim 6 including a guard disposed adjacent to said gasoline engine and said propeller to prevent the ropes of the parachute from being entangled in the propeller blades.

10. The combination of claim 8 wherein said guard includes a tubular member mounted to said engine and located between said engine and said propeller and having a frustro-circular portion extending in proximity to the tips of the propeller blade.

11. The combination of claim 7 including a pulley mounted on the engine drive shaft and a complimentary pulley mounted on the propeller, a belt on said pulley and said complementary pulley for transmitting power from said engine to said propeller.

12. The combination of claim 10 wherein said propeller includes two blades.

* * * * *

UNITED STATES PATENT AND TRADEMARK OFFICE
CERTIFICATE OF CORRECTION

PATENT NO.     : 6,322,021 B1
DATED          : November 27, 2001
INVENTOR(S)    : Fisher et al.

It is certified that error appears in the above-identified patent and that said Letters Patent is hereby corrected as shown below:

<u>Title page,</u>
Item [73], Assignee, change the name of the assignee "Advanced Systems Technolgy, Inc." to -- Advanced System Technologies, Inc. --

Signed and Sealed this

Nineteenth Day of November, 2002

Attest:

JAMES E. ROGAN
Attesting Officer      Director of the United States Patent and Trademark Office